(12) United States Patent
Kenichiro

(10) Patent No.: US 11,664,576 B2
(45) Date of Patent: May 30, 2023

(54) ANTENNA GLAZING

(71) Applicant: AGC GLASS EUROPE, Louvain-la-Neuve (BE)

(72) Inventor: Shimo Kenichiro, Gosselies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 17/059,068

(22) PCT Filed: May 29, 2019

(86) PCT No.: PCT/EP2019/064014
§ 371 (c)(1),
(2) Date: Nov. 25, 2020

(87) PCT Pub. No.: WO2019/229147
PCT Pub. Date: Dec. 5, 2019

(65) Prior Publication Data
US 2021/0210834 A1 Jul. 8, 2021

(30) Foreign Application Priority Data

May 31, 2018 (EP) .................................... 18175411

(51) Int. Cl.
*H01Q 1/12* (2006.01)
*H01Q 1/32* (2006.01)
*H01Q 1/40* (2006.01)

(52) U.S. Cl.
CPC ......... *H01Q 1/1271* (2013.01); *H01Q 1/3266* (2013.01); *H01Q 1/40* (2013.01)

(58) Field of Classification Search
CPC ...... H01Q 1/1271; H01Q 1/3266; H01Q 1/14; H01Q 9/047; H01Q 9/30
See application file for complete search history.

(56) References Cited

U.S. PATENT DOCUMENTS

| 5,483,247 A | * | 1/1996 | Adrian | ................. | H01Q 1/1271 343/711 |
| 5,610,618 A | * | 3/1997 | Adrian | ................. | H01Q 1/1271 343/711 |
| 5,624,591 A | * | 4/1997 | Di Trapani | ....... | B32B 17/10036 219/522 |
| 5,739,794 A | * | 4/1998 | Nagy | ................ | B32B 17/10036 343/711 |
| 5,831,580 A | * | 11/1998 | Taniguchi | .............. | H01Q 13/16 343/713 |

(Continued)

FOREIGN PATENT DOCUMENTS

| CN | 202259666 U | * | 5/2012 |
| FR | 2 621 741 A1 | | 4/1989 |

OTHER PUBLICATIONS

International Search Report dated Aug. 1, 2019 in PCT/EP2019/064014 filed on May 29, 2019.

*Primary Examiner* — Lam T Mai
(74) *Attorney, Agent, or Firm* — Oblon, McClelland, Maier & Neustadt, L.L.P.

(57) ABSTRACT

The present invention concerns a vehicle antenna glazing antenna element. According to the present invention, the antenna element is placed on an outwardly oriented face of the glazing and the antenna is working at a frequency comprised between 750 MHZ and 28 GHZ. The antenna 5 element is connected to a co-axial cable.

20 Claims, 2 Drawing Sheets

(56) References Cited

U.S. PATENT DOCUMENTS

Figure 1:
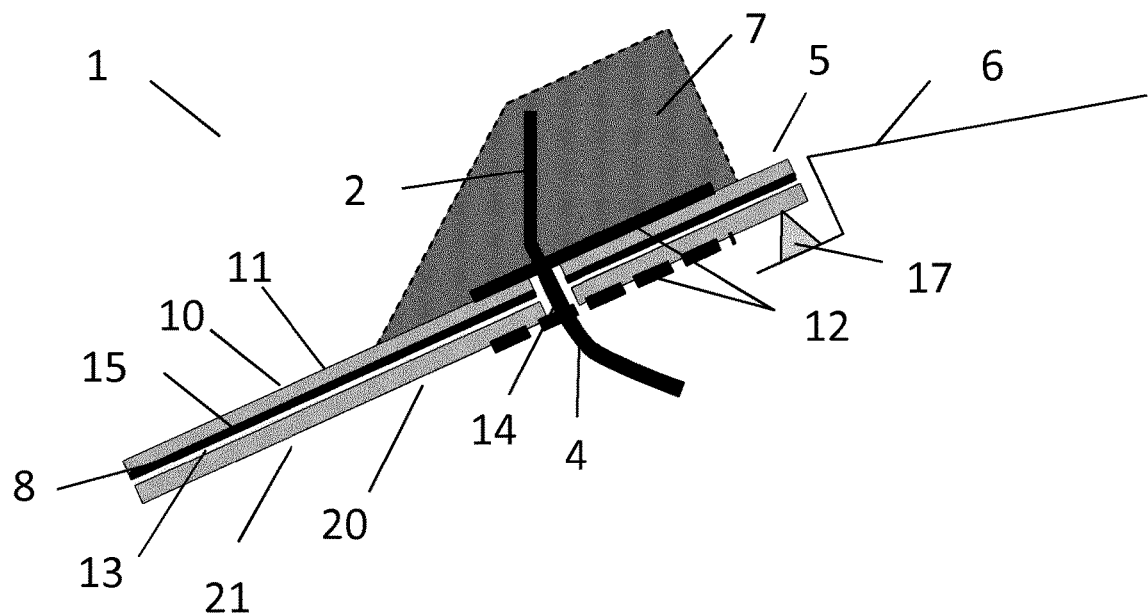

| | | | | |
|---|---|---|---|---|
| 6,172,651 | B1* | 1/2001 | Du | H01Q 1/50 |
| | | | | 343/715 |
| 8,749,366 | B2* | 6/2014 | Hwang | H01Q 1/3266 |
| | | | | 340/438 |
| 9,817,094 | B2* | 11/2017 | Taicher | G01R 33/448 |
| 9,919,496 | B2* | 3/2018 | Michetti | C03C 8/00 |
| 10,135,114 | B2* | 11/2018 | Niwano | H01Q 21/28 |
| 10,811,760 | B2* | 10/2020 | Dai | H01Q 5/30 |
| 10,923,795 | B2* | 2/2021 | Dai | H01Q 13/10 |
| 2006/0273966 | A1* | 12/2006 | Maeuser | B32B 17/10036 |
| | | | | 343/711 |
| 2008/0024379 | A1* | 1/2008 | Urban | H01Q 9/285 |
| | | | | 343/797 |
| 2010/0053004 | A1 | 3/2010 | Schillmeier et al. | |
| 2010/0085261 | A1* | 4/2010 | Baranski | B32B 17/10018 |
| | | | | 343/713 |
| 2012/0256798 | A1* | 10/2012 | Paulus | H01Q 13/10 |
| | | | | 343/713 |
| 2014/0104122 | A1* | 4/2014 | Lee | H01Q 9/42 |
| | | | | 343/713 |
| 2016/0006107 | A1* | 1/2016 | Baranski | H01Q 21/28 |
| | | | | 343/873 |
| 2016/0013540 | A1* | 1/2016 | Baranski | H01Q 1/1271 |
| | | | | 156/60 |
| 2017/0324143 | A1 | 11/2017 | Talty et al. | |

* cited by examiner

ANTENNA GLAZING

The invention relates to an antenna glazing comprising an antenna element provided on a glazing and more particularly the invention concerns a vehicle glazing comprising an antenna element.

Vehicle-to-everything also called V2X communication as well as automotive radar are fast growing areas of consumer interest. This gives rise to a challenge to a well-working communication systems in handling the V2X radio channel. The two most important components influencing the channel are the antennas. Therefore, finding the optimal antenna configuration to ensure the best performance is a difficult task.

Following the success story of passive and autonomous active safety systems, cooperative Intelligent Transportation Systems based on vehicular communication are the next important step to the vision of accident-free driving. In recent years, various research projects have contributed solutions for the fundamental technological requirements of vehicle communication.

Vehicle-to-everything (V2X) communication is the passing of information from a vehicle to any entity that may affect the vehicle, and vice versa. It is a vehicular communication system that incorporates other more specific types of communication as V2I (Vehicle-to-Infrastructure), V2V (Vehicle-to-vehicle), V2P (Vehicle-to-Pedestrian), V2D (Vehicle-to-device) and V2G (Vehicle-to-grid). The main motivations for V2X are safety and energy savings.

V2X communication is based on WLAN technology and works directly between vehicles, which form a vehicular ad-hoc network as two V2X senders come within each other's range. Hence it does not require any infrastructure for vehicles to communicate, which is key to assure safety in remote or little developed areas. WLAN is particularly well-suited for V2X communication, due to its low latency. It transmits messages known as Common Awareness Messages (CAM) and Decentralised Notification Messages (DENM) or Basic Safety Message (BSM). The data volume of these messages is very low. The radio technology is part of the WLAN IEEE 802.11 family of standards and known in the US as Wireless Access in Vehicular Environments (WAVE) and in Europe as ITS-G5.

V2V (short for vehicle to vehicle) is an automobile technology designed to allow automobiles to "talk" to each other. The systems will use a region of the 50.8 to 5.9 GHz bands, the frequency also used by WiFi. V2V is also known as VANETs (vehicular ad hoc networks). It is a variation of MANETs (mobile ad hoc networks), with the emphasis being now the node is the vehicular.

Vehicular communication systems are networks in which vehicles and roadside units are the communicating nodes, providing each other with information, such as safety warnings and traffic information. They can be effective in avoiding accidents and traffic congestion. Both types of nodes are dedicated short-range communications (DSRC) devices. DSRC works in 5.8-5.9 GHz band. Vehicular communications is usually developed as a part of intelligent transportation systems (ITS).

They may be employed as fixed antennas for vehicles, particularly for voice communications of the digital network for digital radio communications satellite, or as a receiving antenna for satellite remote sensing systems, such as GPS (Global position System), which can locate the position of a vehicle, wherever he is. To functioning properly, we must limit their activity to a narrow frequency band and be paid them with great accuracy. They must also be able to maintain this capacity when the environment is a source of noise. Therefore it should be kept clean and also protect them from external factors of disturbance or attenuation.

In the automotive field, antennas may be assembled within the glazing, i.e. windshield, backlite, sidelite or sunroof or fixed in the carbody, such as roof. There are different antenna systems used in a vehicle. However, conventional glass antennas are placed on the surface of the glazing on the face facing the interior of car or are embedded in the laminated glazing. Therefore, those antennas are submitted to glass dielectric effect decreasing the efficiency especially for outward radiation.

Modern cars may contain multiple antennas for analog audio broadcasts (amplitude modulated (AM—0.5-1.7 MHz) and frequency modulated (FM—76-108 MHz), global positioning system (GPS—1575 MHz) data, cellular phone communication, e.g. global system for communication (GSM—800/1800 MHz), long term evolution (LTE—800/1800/2600 MHz), digital audio broadcasting (DAB—170-240 MHz), remote keyless entry (RKE—315/433 MHz), television reception, tire pressure monitor system (TPMS—315/433 MHz), automotive radar (22-26 GHz/76-77 GHz), car to car communication (C2C—5.9 GHz), etc.

A first system is well-known and described in U.S. Pat. No. 8,519,897B2. Low-profile antenna assembly or Shark fin type car antenna assembly, are configured for using with AM/FM radio, satellite digital audio radio services (SDARS), global positioning systems (GPS), digital audio broadcasting (DAB)-VHF-III, DAB-L, Wi-Fi, Wi-Max, and cell phones. In some example embodiments, the antenna assemblies include at least two antennas co-located, for example, on common chassis of the antenna assemblies, under common covers of the antenna assemblies. Such antennas are commonly placed on roofs, hoods, or trunks of automobiles to help to ensure that the antennas have unobstructed views overhead or toward the zenith. In addition to an aesthetic point of view, it is more and more difficult to design external shark because of the need of more and more antennas the shark in recent years. That would cause the bloated structure or mutual interference of antennas. Finally it is not possible to assemble on convertible car.

A second well-known system is backlite antenna system utilizing defogger elements already encapsulated in the back window of the vehicle as antenna elements to receive the AM and FM broadcasts. Examples of such backlite antenna systems can be found in U.S. Pat. No. 5,293,173 or in U.S. Pat. No. 5,099,250. For the known combination defogger/antenna element systems embedded in rear windows of vehicles, it has been necessary to incorporate two bifilar or toroidal chokes between the elements and the vehicle DC power supply so as to separate the antenna signals from the high current signals that heat the elements.

A third system is well-known and described in US publication US2014104122A1. This system consists of a window assembly with an antenna element including wire or transparent coating disposed within the glazing. This type of antennas is generally configured to receive linearly polarized radio frequency (RF) signals. Specifically, the linearly polarized RF signals which the antenna element may receive, in a non-limiting manner, AM, FM, RKE, DAB, DTV and cell phone signals.

With the evolution of technologies, vehicles are equipped with a lot of antennas to be able to communicate (receiving or emitting information). Some are fixed on the carbody, others are placed on the glazing panels of glass.

Thus, the present invention proposes an easy solution to provide an antenna provided on a glazing which is particularly suitable for V2X communication also known as Vehicle-to-X (V2X)—V2X communication.

The present invention concerns a vehicle antenna glazing comprising an antenna element on an outwardly oriented face of the glazing and the antenna is a 750 MHZ to 28 GHZ antenna. The antenna element is connected to a co-axial cable.

The antenna according to the present invention may be an ITS (760 MHZ), a DSRC (5.8 GHZ-5.9 GHZ), a GPS/GLONASS (1575 MHZ/1605 MHZ), 4G/LTE (700-900 MHZ, 1710-2170 MHZ, 2500-2700 MHZ), 5G (28 GHZ) antenna or SDARS antenna (2320-2345 MHz).

According to a preferred embodiment of the present invention, the antenna is working for a dedicated short-range communication (DSRC) and cellular devices for vehicle-to-X communication.

According to a preferred embodiment of the present invention, the antenna is 50.8 GHZ-5.9 GHZ antenna.

DSRC (Dedicated Short Range Communications) is the communication medium of choice for active safety V2V (Vehicle-to-Vehicle) and V2X (Vehicle-to-other) systems, primarily allocated for vehicle safety applications. DSRC supports high speed, low latency, short-range V2V/V2X wireless communications.

By placing the antenna element on the an outwardly oriented face of the glazing according to the present invention, the performances of the antenna element are improved by avoiding the glass dielectric effect. Furthermore, by providing an antenna element on the an outwardly oriented face of the glazing a three-dimensional design of the antenna is possible. Furthermore, the antenna element according to the present invention is compatible with a heated glazing like a heated coated glazing or heated wired glazing. Both glazing are well-know and commonly used today, however, they may interfere with the efficiency of the antenna element when the antenna is within the glazing The antenna element may also be placed in accordance with the invention, on a monolithic glazing on a laminated glazing.

According to one embodiment of the present invention the glazing is a laminated glazing or more particularly the glazing is a windshield.

According to the present invention, the antenna element is connected to a coaxial cable.

According to a preferred embodiment of the present invention, the antenna element and the coaxial cable are provided in the upper part of the glazing ie not in the field of vision. More preferably, the antenna element and the coaxial cable are placed in the upper part of the glazing and more particularly at proximity of the upper edge of the glazing.

According to the embodiment, the coaxial cable, connected to the antenna element goes through the glazing as shown. Thus, a hole in the glazing is provided to allow the passage of the coaxial cable. The dimension of the hole is equivalent to the diameter of the coaxial cable. Thus the cable is introduced inside the vehicle through the glazing. The cable may be thus connected the power system used for the camera, rain sensor . . . which are for example placed in the camera zone in the inner rear mirror zone. The coaxial cable may pass through totally or partially the glazing (a hole only in the external pane of glazing or hole across all the thickness of the glazing) to be connected to the power system. The coaxial cable may extend along the edge of the glass to be connected to the power system.

According to an embodiment of the present invention, to mask and protect the antenna element provided on face 2, a cover is placed on the antenna element. Thus, the antenna element is protected from external environment. The cover may be a plastic cover or in any suitable material resisting to external environment (weather, UV . . . ). The cover may be made in plastic material.

According to an embodiment of the present invention, the antenna element is a patch element. The particularity of this antenna is that is a small antenna with high efficiency. For example, the patch may have the following dimensions: 36×30×10 mm. the patch antenna has a very compact size enabling flexibility of integration. Depending on the position and its direction of the antenna element on the outwardly face of the glazing, the may be in a Y or Z-direction. Indeed, if the antenna element is placed vertically is then Y-direction oriented, if the antenna element is placed horizontally on the glazing, then the antenna is Z-direction oriented.

According to the present invention, the glazing can be a flat or curved panel to fit with the design of the car. The pane of glass can be tempered or laminated to respect with the specifications of security. A heatable system, for example a coating or a network of wires or silver print on a pane of glass, can be applied on the pane of glass to add a defrosting function for example. Also, the pane of glass can be a clear glass or a colored glass, tinted with a specific composition of the glass or by applying a coating or a plastic layer for example.

Other advantages, as well as appropriate achievements and developments of the invention are developed in the claims and in the description of embodiments with reference to the figures which show:

FIG. 1 to FIG. 4 are an examples of implementing particular embodiments of the present invention.

For simplicity, the numbering of the glass sheets in the following description refers to the numbering nomenclature conventionally used for glazing. Thus, the face of the glazing in contact with the environment outside the vehicle is known as the side 1 and the surface in contact with the internal medium, that is to say the passenger compartment, is called face 2. For a laminated glazing, the glass sheet in contact with the outside environment the vehicle is known as the side 1 and the surface in contact with the internal part, namely the passenger compartment, is called face 4.

For avoidance of doubt, the terms "external" and "internal" refer to the orientation of the glazing during installation as glazing in a vehicle.

Also for avoidance of doubt, the present invention is applicable for all means of transport such as automotive, train, plane . . . .

FIG. 1 shows a laminated glazing 1, more particularly a windshield. The glazing 1 comprises two glass sheets 10 and 20, for example 2.1 mm thick for the external glass sheet 30 and 1.6 mm thick for the internal glass sheet 20, and joined by means of a thermoplastic sheet 8 of 0.76 mm made of, for example, polyvinylbutyral. According to the present invention, the antenna element 2 is provided in face 1 ie on the outwardly face 11 of the glazing 1. In the present embodiment, the antenna element 2 is provided in the upper part 5 of the glazing near the camera zone, more particularly between the camera zone and the lower part of the vehicle's roof or car body 6.

According to the present embodiment, ground planes 12, acting to reflect surface for radio waves, are provided on face 1 and face 4 (11 and 21) of the laminated glazing 1. The antenna 2 is in contact with the ground plane 12 provided in face 2 (13). In the present embodiment, the antenna element 2 may be a 12-13 mm (this is ¼ wavelength monopole antenna) DSRC-V2X antenna element operating at a frequency band of 5.8 or 5.9 GHZ. In an embodiment, for more efficiency, instead of shortening antenna, parasitic element may be added to control the antenna radiation pattern. Thus, the vehicle may communicate with another vehicle or any entity that may affect the vehicle, and vice-versa. It is understood that the dimension of the antenna depends on the design capability in the future.

DSRC (Dedicated Short Range Communications) is the communication medium of choice for active safety V2V (Vehicle-to-Vehicle) and V2X (Vehicle-to-other) systems, primarily allocated for vehicle safety applications. DSRC supports high speed, low latency, short-range V2V/V2X wireless communications.

The antenna element 2 is connected to a coaxial cable. According to the embodiment, the coaxial cable 4, connected to the antenna element 2 goes through the glazing 14 as shown in FIG. 1. thus, a hole 14 in the glazing is provided to allow the passage of the coaxial cable 4. The dimension of the hole 14 is equivalent to the diameter of the coaxial cable 4. Thus the cable 4 is introduced inside the vehicle through the glazing. The cable may be thus connected the power system used for the camera, rain sensor . . . which are generally placed in the camera zone in the inner rear mirror zone.

In the embodiment, black enamel 15, commonly used to mask all no aesthetics elements like connectic, sensors . . . is provided on face 2 (13). It is understood that the enamel or any masking band may be provided in face 2 and/or face 3 and/or face 4 (21).

To mask and protect the antenna element 2 provided on face 2 (13), a cover 7 is placed on the antenna element 2 and ground plane 12. Thus, the antenna element 2 is protected from external environment. The cover 7 may be a plastic cover or in any suitable material resisting to external environment (weather, UV . . . ).

This embodiment relates to a windshield 1, ie a laminated glazing, however, it could be transposed to a glazing made in one pane of glass like sidelite, backlite . . . the antenna element 2 is then provided in face 1 of the glazing.

Thus, by providing an antenna element 2 on the outwardly face 11 of the glazing 1, glass dielectric effect is avoided, a three-dimensional design of the antenna is possible. Furthermore, the antenna element 2 according to the present invention is compatible with a heated glazing like a heated coated glazing or heated wired glazing. Both glazing are well-know and commonly used today, however, they may interfere with the efficiency of the antenna element.

It is understood that any antenna element 2 working at a frequency comprised between 750 MHZ and 28 GHZ may be used alone or in combination to scan a larger number of frequencies.

Figure 2:
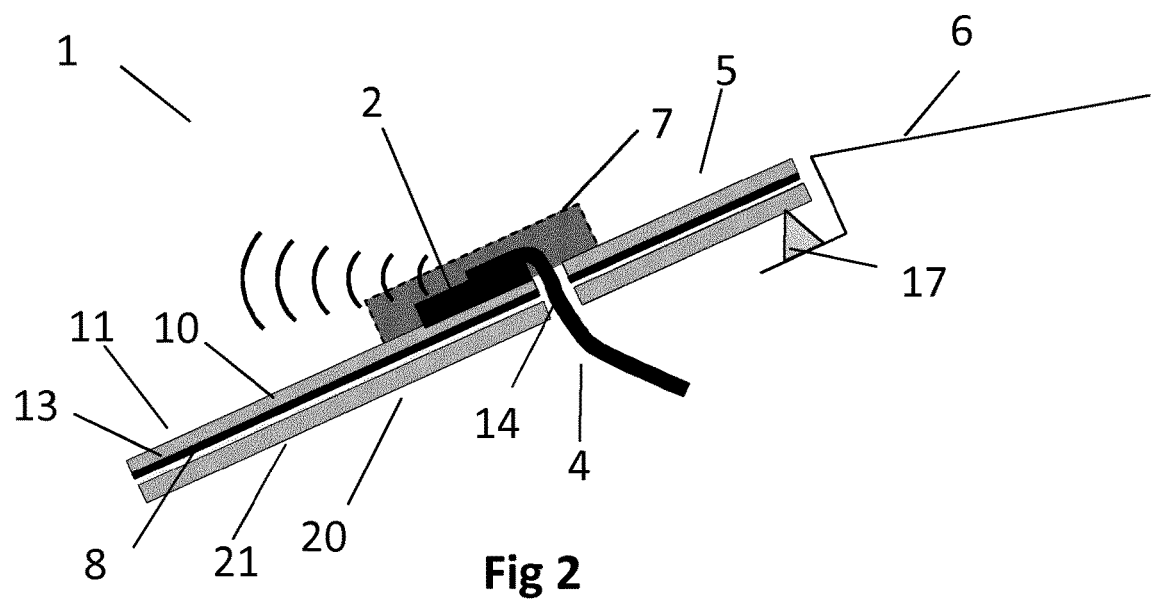

FIG. 2 shows another embodiment of the present invention. More particularly, FIG. 2 shows a laminated glazing 1, more particularly a windshield. The glazing comprises two glass sheets 10 and 20, for example 2.1 mm thick for the external glass sheet 10 and 1.6 mm thick for the internal glass sheet 20 and joined by means of a thermoplastic sheet 8 of 0.76 mm made of, for example, polyvinylbutyral. According to the present invention, the antenna element 2 is provided in face 1 (11) ie on the outwardly face 11 of the glazing. In the present embodiment, the antenna element 2 is provided in the upper part 5 of the glazing near the camera zone, more particularly between the camera zone and the lower part of the vehicle's roof or car body 6.

According to the present embodiment, the antenna element 2 is a patch antenna as for example an antenna from Taoglass© (GSA.8859.A.105111). The antenna element 2 according to this embodiment is a mini external DSRC antenna that operates from 5.8 to 5.9 GHZ for DSRC systems, for V2V and V2X applications. This patch is mounted (fixed) on face 1 (11) as for the glazing illustrated in FIG. 1. The antenna element 2 may be fixed to the face 1 (11) with an adhesive 17. The particularity of this antenna 2 is that is a small antenna with high efficiency. For example, the patch may have the following dimensions: 36×30×10 mm. the patch antenna has a very compact size enabling flexibility of integration. Depending on the position and its direction of the antenna element on the outwardly face of the glazing, the may be in a Y or Z-direction. Indeed, if the antenna element is placed vertically is then Y-direction oriented, if the antenna element is placed horizontally on the glazing (as shown in FIG. 2), then the antenna is Z-direction oriented.

As for FIG. 1, the antenna element 2 is connected to a coaxial cable 4 which goes through the glazing, through a hole 14 provided in the glazing to be connected to the power system used for the camera, rain sensor . . . which are generally place in the camera zone in the inner rear mirror zone.

As for FIG. 1, a black band 15 (enamel or other) in provided on face 2 (13). It is understood that the enamel or any masking band may be provided in face 2 and/or face 3 and/or face 4 (21).

To mask and protect the antenna element provided on face 2, a cover is placed on the antenna. Thus, the antenna element is protected from external environment. The cover may be a plastic cover or in any suitable material resisting to external environment (weather, UV . . . ).

This embodiment relates to a windshield, ie a laminated glazing, however, it could be transposed to a glazing made in one pane of glass like sidelite, backlite . . . the antenna element is then provided in face 1 of the glazing.

Figure 3:
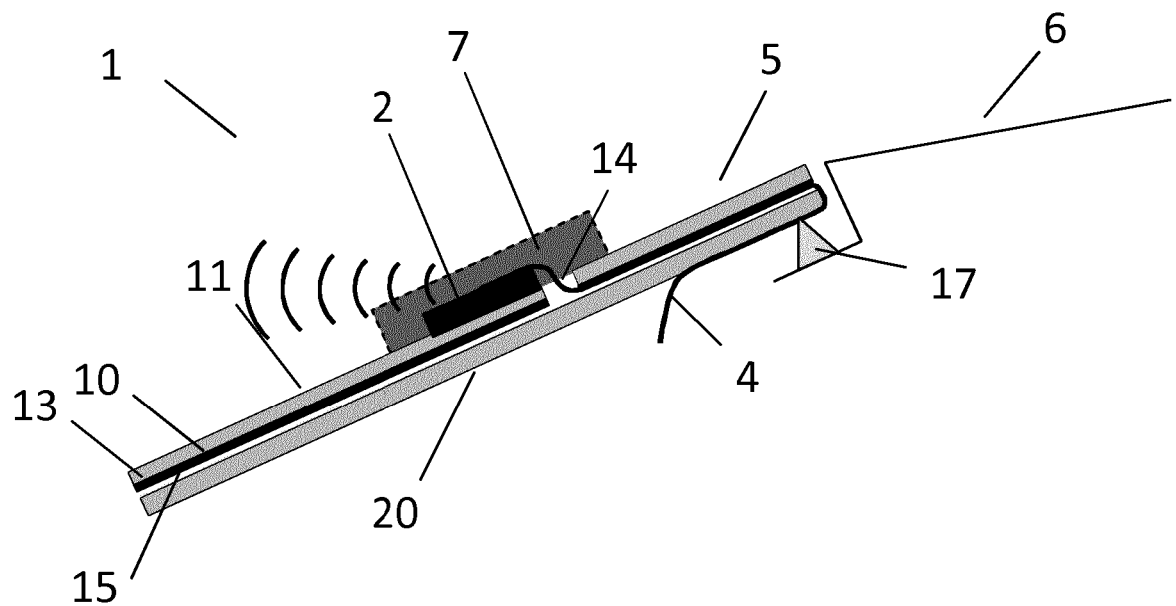

FIG. 3 shows another embodiment of the present invention. More particularly, FIG. 3 shows a laminated glazing 1, more particularly a windshield. The glazing comprises two glass sheets 10 and 20, for example 2.1 mm thick for the external glass sheet 10 and 1.6 mm thick for the internal glass sheet 20 and joined by means of a thermoplastic sheet 8 of 0.76 mm made of, for example, polyvinylbutyral. According to the present invention, the antenna element is provided in face 1 (11) ie on the outwardly face (11) of the glazing. In the present embodiment, the antenna element 2 is provided in the upper part 5 of the glazing near the camera zone, more particularly between the camera zone and the lower part of the vehicle's roof or car body. The antenna element 2 is a patch DSRC antenna as described for FIG. 2.

In the present embodiment, the antenna element 2 is connected to a flat coaxial cable 4 which goes partially through the glazing, through a hole 14 provided only in the external pane 10 of glass of glazing. The flat coaxial 4 extends along the thermoplastic sheet (PVB . . . ) in face 2 (13) to be then directed to the upper edge (5) of the glazing and inside the vehicle to be connected to the power system used for the camera, rain sensor . . . which are generally place in the camera zone in the inner rear mirror zone as shown in FIG. 3.

According to another embodiment, the flat coaxial cable 4 may pass through a hole 14 provided only in the external pane of glass of glazing and extends along the thermoplastic sheet (PVB . . . ) in face 3 to be then directed to the upper edge 5 of the glazing and inside the vehicle to be connected to the power system used for the camera, rain sensor . . . which are generally place in the camera zone in the inner rear mirror zone.

It is understood, that any antenna element according to the present invention may be used in this particular embodiment.

Figure 4:
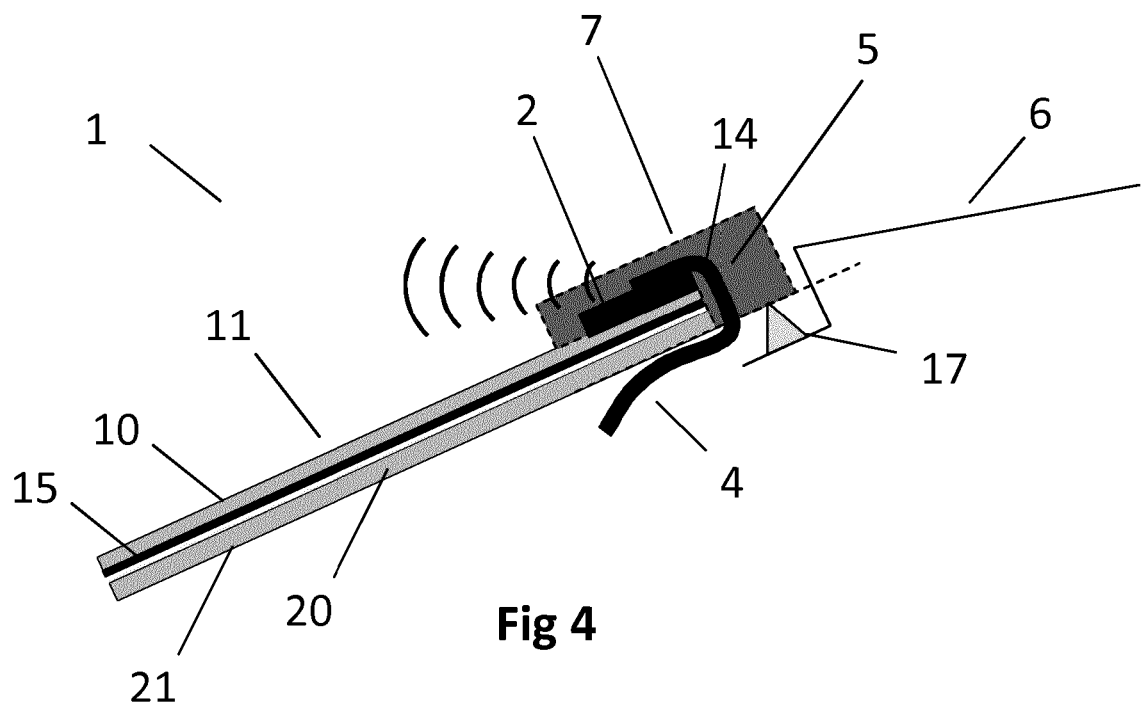

FIG. 4 shows as for FIGS. 1 and 2 an example of laminated glazing 1 comprising on face 1 (11) an antenna element 2 according to the present invention. In the particular embodiment, the antenna element 2 is a patch antenna as in described in FIG. 2, placed on face 1 (11) of the glazing. The upper part 5 of the antenna element is flush with the upper edge of the glazing 1.

The cover 7 used to mask and to protect the antenna element is placed on the antenna element 2 and extends to the lateral edge of the glazing as shown in the FIG. 4. Thus, the antenna element 2 is protected from external environment. The cover 7 may be a plastic cover or in any suitable material resisting to external environment (weather, UV . . . ). The coaxial cable 4 connected to the antenna element 2 is then brought back inside the vehicle from the upper edge 5 of the glassing to be connected to power system. In this embodiment, no hole is made through the glass to allow the passage of the coaxial cable. The glazing comprising the antenna element connected to a coaxial cable and covered with a cover box is mounted to the vehicle body.

According to another embodiment, the antenna element, placed in the upper edge 5 of the glazing, may have a part placed on the face 1 of the glazing and a part a part extended from the glazing.

According to the present invention, one or several antennas may be placed on the outwardly face of the glazing, for example an V2X and a GPS antennas may be placed on the face 1 of the glazing, the antennas being connected to a coaxial cable. The coaxial cable may pass through totally or partially the glazing (a hole only in the external pane of glazing or hole across the thickness of the glazing) to be connected to the power system. The coaxial cable may extend along the edge of the glass to be connected to the power system.

The invention claimed is:

1. A vehicle antenna glazing comprising:
   an antenna element; and
   a glazing,
   wherein the antenna element is placed on an outwardly oriented face of the glazing and the antenna element works at a frequency between 750 MHZ and 28 GHZ,
   wherein the antenna element is connected to a co-axial cable, and
   wherein the antenna element is a 5.8 GHZ to 5.9 GHZ antenna element.

2. The glazing according to claim 1, wherein the antenna element is a DSRC-V2X or cellular-V2X antenna.

3. The glazing according to claim 1, wherein the antenna element is provided on an upper edge of the glazing to be covered by a vehicle body.

4. The glazing according to claim 1, further comprising several antennas having different frequencies placed on an outwardly oriented face of the glazing.

5. The glazing according to claim 1, wherein the co-axial cable goes through the glazing.

6. The glazing according to claim 1, wherein the antenna element is a patch antenna.

7. The glazing according to claim 1, wherein the antenna element is protected by a cover.

8. The glazing according to claim 1, wherein the glazing is a laminated glazing.

9. The glazing according to claim 1, wherein the glazing is a windshield.

10. The glazing according to claim 1, wherein the glazing is a heated coated windshield.

11. The glazing according to claim 7, wherein the antenna element is provided in an upper edge of the glazing.

12. The glazing according to claim 7, wherein the antenna element is protected by a plastic cover.

13. The glazing according to claim 7, wherein the antenna element is provided in a rear view mirror.

14. A vehicle antenna glazing comprising:
    a glazing, and
    several antennas having different frequencies placed on an outwardly oriented face of the glazing,
    wherein the antennas work at a frequency between 750 MHZ and 28 GHZ, and
    wherein the antenna element is connected to a co-axial cable.

15. The glazing according to claim 14, wherein the antenna element is a DSRC-V2X or cellular-V2X antenna.

16. The glazing according to claim 14, wherein the antenna element is provided on an upper edge of the glazing to be covered by a vehicle body.

17. A vehicle antenna glazing comprising:
    an antenna element; and
    a glazing,
    wherein the antenna element is placed on an outwardly oriented face of the glazing and the antenna element works at a frequency between 750 MHZ and 28 GHZ,
    wherein the antenna element is connected to a co-axial cable, and
    wherein the co-axial cable goes through the glazing.

18. The glazing according to claim 17, wherein the antenna element is a DSRC-V2X or cellular-V2X antenna.

19. The glazing according to claim 17, wherein the antenna element is provided on an upper edge of the glazing to be covered by a vehicle body.

20. The glazing according to claim 17, further comprising several antennas having different frequencies placed on an outwardly oriented face of the glazing.

* * * * *